Dec. 7, 1948. H. BRAMMER 2,455,400
LAMINATED DRIVING BELT
Filed Feb. 4, 1944
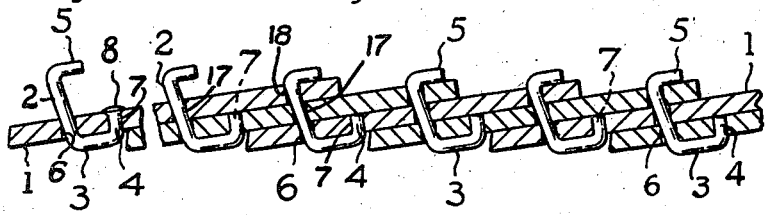
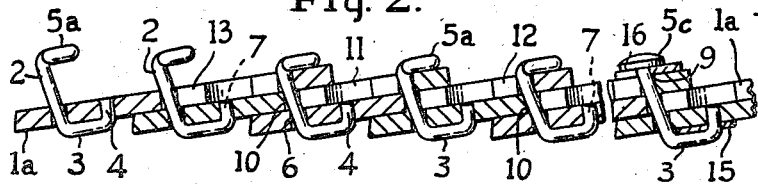
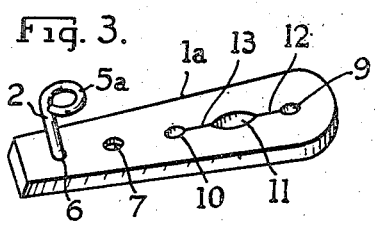
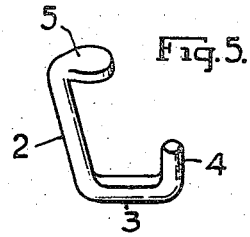
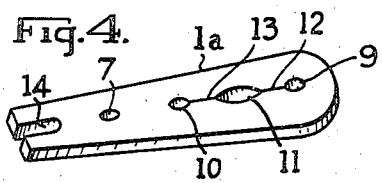
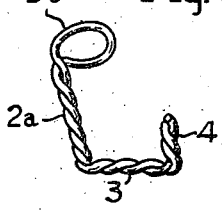
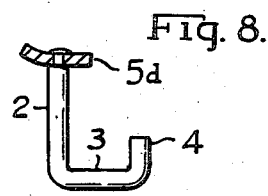
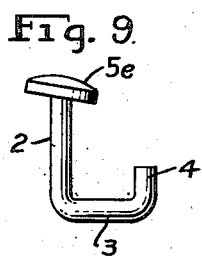
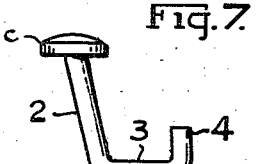
Inventor:
Harry Brammer,
by Pierce & Scheffler,
Attorneys.

Patented Dec. 7, 1948

2,455,400

UNITED STATES PATENT OFFICE 2,455,400

LAMINATED DRIVING BELT

Harry Brammer, Leeds, England

Application February 4, 1944, Serial No. 521,120
In Great Britain February 17, 1943

7 Claims. (Cl. 74—232)

This invention relates to laminated driving belts of the kind comprising a number of superimposed detachable links formed from pieces of leather, rubber, rubberised fabric, or similar material, and secured together by link fasteners.

In belting of this kind the link fasteners sometimes comprise bolts and nuts, or headed studs which may be detachable or riveted to the links. In my prior British specifications Nos. 153,712 and 340,065 belting is described comprising flexible links each formed with a plurality of holes and/or slots therein joined by slits, and furnished with a headed stud at one end riveted to the link.

According to the present invention, in or for laminated driving belts, a link fastener is made substantially L-shaped with the end of the base part turned up and the shank furnished with a detachable or integral head. The said shank may be vertical or set at an angle relative the base and the head may be arranged at a right or other angle on such shank.

Moreover, the head of the fastener may be of any desired formation and comprise an extension of the shank or join the shank at a point within or adjacent its own peripheral edge. The head may only project back over the base, e. g., be formed or provided on the side nearest the aforesaid upturned end.

According to a feature of the invention laminated belting has its links connected by link fasteners which are substantially L-shaped with the end of the base turned up so that the base lies against the face of a link with its turned up end located in a hole in the link and the shank of the fastener passing through a hole or open slot in the link and also through adjacent links with its head bearing against the outer face of the link furthest from that to which the fastener is anchored.

Referring now to the accompanying drawing in which several embodiments of the invention are shown by way of example only:

Fig. 1 shows a length of laminated belting in section including one form of the improved link fasteners;

Fig. 1a shows the same type of link and fastener as Fig. 1 excepting that the end of the fastener is riveted through the link.

Fig. 2 shows a length of another type of laminated belting in section with a modified form of link fastener;

Fig. 2a shows the same type of link and fastener as Fig. 2 with washers interposed between the fastener and the links.

Fig. 3 is a perspective view of the link and fastener of Fig. 2.

Fig. 4 is a perspective view of another form of link.

Fig. 5 shows a link fastener with a flattened head and base;

Fig. 6 shows a link fastener of twisted wire;

Fig. 7 shows a link fastener with a round head;

Fig. 8 shows a link fastener with a head curved up on one side.

Fig. 9 shows a fastener similar to that shown in Fig. 7 but with the shank perpendicular to the base.

In Fig. 1 the links 1 forming the laminated belting are held together by link fasteners 2 which are pressed or otherwise formed from a rod or wire into substantially L-shape with the end of the base 3 turned up at 4 a short distance. Preferably, but not necessarily, the end 4 is turned up a distance approximately equal to the thickness of a link. The shank of each fastener is inclined relative the base to an obtuse angle as the shank automatically assumes an inclined position when a belt is in tension. The head 5 is simply the end of the shank bent over at an angle (other than a right angle) and parallel with the base. This construction allows the base 3 and head 5 to be flat against the adjacent link face and tension on the belt tends to hold the end 4 more firmly in position.

A fastener is anchored to a link by forming two holes 6 and 7 (or other suitable apertures) in the latter to receive the shank and upturned end 4 and the latter is first threaded through hole 6 and the base 3 pushed through until the shank is located in this hole and the end 4 can be pressed up into the other hole 7. In some cases it may be found advisable to rivet the upturned end 4 over as at 8 as shown in Fig. 1a. The head may be substantially flat and made circular, as illustrated in Figs. 3, 5 and 6 or more or less rectangular or D-shaped or of spade or other formation in plan. The shank may join the head at or about its centre (see Fig. 7) or other point within its peripheral edge, or adjacent such edge (see Fig. 5. Also the base may be flattened (see Fig. 5) or otherwise formed to lie closely to a belt link and provide a good bearing surface.

The links 1 of the belting shown in Fig. 1 are provided only with holes 6, 7, 17 and 18 for the fasteners.

Figs. 2 and 3 show laminated belting formed of links 1a which are furnished with holes 6, 7, for the attachment of the fasteners 2, holes 9, 10 for fasteners to be threaded into and a slot 11 connected to the latter holes by slits 12, 13 for facilitating the threading operation, i. e., a fastener is pushed through slot 11 and its shank forced through slit 12 or 13 into hole 9 or 10. The head 5a is bent into a loop to increase the bearing surface and may be bent to another shape or position as desired. The upturned ends 4 may be riveted over as shown at 8 of Fig. 1a. In the form of link illustrated in Fig. 4 a slot 14 instead of a hole 6 (or a slit leading into a hole 6) may serve to dispense with the threading operation when attaching a fastener 2. The form of link shown in Fig. 4 may be used exclusively or substituted for one or more of the links in the belting illustrated in Figs. 1 and 2. Any base 3 may be flattened as shown in Fig. 5 and/or a bearing washer 15 located between it and the link, and a bearing washer 16 may be employed between any head and the link as show in Fig. 2a.

Fig. 5 shows a modification of the fastener in Fig. 1 wherein the base 3 is flattened and the head 5 is also flattened to increase the bearing surface.

In Fig. 6 the modified fastener 2a is formed from wire by making a head 5b as a loop and then twisting the ends together to form the shank, base 3 and upturned end 4. The head may be bent to another shape or position as desired.

Fig. 7 shows a fastener similar in shape to that in Fig. 1 but with an integral round head 5c located centrally on the shank. The head could be a separate one secured on the shank end. The shank may be at a right angle to the base as shown in Fig. 9.

In Fig. 8 the fastener of Fig. 9 is modified by substituting a separate head 5d riveted in position and bent up on one side. If desired the whole head could be canted down towards the end 4 or the shank inclined as the other fasteners with the head level. The fastener illustrated in Fig. 9 is, as stated above, like that illustrated in Fig. 7 excepting that the shank 2 is perpendicular to the base 3. The head 5e, however, is at the same angle to the shank as is the head 5c of Fig. 7.

The above fastener may be modified in a variety of ways but in all cases provides a simple but efficient link securing device with a good anchorage. The formation of the fastener provides a good bearing surface on the link to which it is attached and, as the said base extends longitudinally, complete flexibility of the link is allowed when running round a pulley which is not the case with riveted or headed studs which stiffen the link for a given concentrated area so that sharp flexion takes place adjacent such area and in time destroys or deforms the link. Any of the above constructions may be made from spring wire, employ detachable heads, although integral heads provide the more simple constructions and can be formed by simply turning over and flattening and/or shaping the end of the shank, or twisting wire to shape.

What I claim is:

1. A preformed detachable fastener adapted to be associated with the links of a driving belt without deformation comprising integral shank, base and upturned end portions lying in the same plane, at least said shank and upturned end portions being of substantially the same size and cross-sectional shape, said base portion extending laterally from one end of said shank portion at an obtuse angle and said upturned end portion extending laterally from the end of said base portion remote from said shank portion and in the same general direction as said shank portion and a head on the other end of said shank portion having a surface adapted to bear against a link of the belt, said surface lying on the same side of the shank portion as said base portion, and lying in a plane at an acute angle to the shank portion.

2. A performed detachable fastener as defined in claim 1 in which the head has a surface adjacent the shank portion and on the opposite side thereof from the base portion, said surface lying in a plane at an obtuse angle to the shank portion.

3. A preformed detachable fastener as defined in claim 1 in which the shank, base and upturned end portions and the head are formed of an integral cylindrical rod, the head being in the form of a loop.

4. A preformed detachable fastener as defined in claim 1 comprising at least two strands of wire twisted together to form the shank, base and upturned end portions and the head thereof.

5. A preformed detachable fastener as defined in claim 1 in which the base portion has a flat surface adapted to bear against a link of the belt.

6. Laminated belting comprising a plurality of superposed links held together by preformed detachable fasteners, each of said fasteners comprising, integral shank, base and upturned end portions lying in a plane, said shank and upturned end portions being of substantially the same size and cross-sectional shape and extending in the same general direction from the opposite ends of said base portion and a head on the end of said shank portion remote from said base portion, the shank portion of each fastener passing through preformed openings in at least two superposed links, the base portion of each fastener extending lengthwise of the belt and bearing against the outer face of one link, the upturned end portion of each fastener extending into another preformed opening through said last named link and the head of each fastener bearing against the outer face of another link furthest from said base portion.

7. Laminated belting as defined in claim 6 in which the bearing surfaces of the heads and the base portions of the fasteners are disposed at oblique angles to the shank portions and the shank portions are inclined to the longitudinal axis of the belt while said bearing surfaces lie substantially parallel to the adjacent surfaces of the belt, the bearing surfaces of the base portions being at obtuse angles and the bearing surfaces of the head portions being at acute angles to the shank portion.

HARRY BRAMMER.

REFERENCES CITED

The following references are of record in the file of this patent:

UNITED STATES PATENTS

| Number | Name | Date |
|---|---|---|
| 1,147,874 | Kolbe | July 27, 1915 |
| 2,249,726 | Brammer | July 22, 1941 |

FOREIGN PATENTS

| Number | Country | Date |
|---|---|---|
| 21,854 | Britain | Oct. 11, 1904 |
| 104,949 | Australia | Sept. 8, 1938 |
| 173,092 | Germany | Aug. 2, 1906 |
| 318,556 | Germany | Jan. 29, 1920 |
| 340,065 | Britain | Dec. 24, 1930 |
| 523,337 | Britain | July 11, 1940 |